US009002558B2

(12) United States Patent
Kurita (10) Patent No.: US 9,002,558 B2
(45) Date of Patent: Apr. 7, 2015

(54) ABNORMALITY DIAGNOSIS APPARATUS FOR POWER CONTROL SYSTEM (71) Applicant: Denso Corporation, Kariya, Aichi-pref. (JP)

(72) Inventor: Toyoaki Kurita, Obu (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 13/834,300

(22) Filed: Mar. 15, 2013

(65) Prior Publication Data

US 2013/0268158 A1 Oct. 10, 2013

(30) Foreign Application Priority Data

Apr. 5, 2012 (JP) .................................. 2012-86666

(51) Int. Cl.
*B60L 3/00* (2006.01)
(52) U.S. Cl.
CPC .. *B60L 3/00* (2013.01); *B60L 3/003* (2013.01)
(58) Field of Classification Search
None
See application file for complete search history.

(56) References Cited

U.S. PATENT DOCUMENTS

| 2006/0021098 A1* | 1/2006 | Tezuka .......................... 903/922 |
| 2009/0108674 A1* | 4/2009 | Ozaki et al. .................. 307/10.6 |
| 2012/0007553 A1* | 1/2012 | Ichikawa et al. .............. 320/109 |
| 2012/0086278 A1* | 4/2012 | Kanie et al. ..................... 307/66 |
| 2012/0089290 A1* | 4/2012 | Kato et al. ....................... 701/22 |
| 2013/0221921 A1* | 8/2013 | Ang .............................. 320/109 |

* cited by examiner

*Primary Examiner* — John R Olszewski
*Assistant Examiner* — Jess Whittington
(74) *Attorney, Agent, or Firm* — Nixon & Vanderhye PC (57) ABSTRACT After turning a main relay to a full off-state and turning a charger relay to a full off-state or a half off-state only one of a positive-side switch and a negative-side switch is turned of voltage application processing is performed to control a bidirectional DC-DC converter to apply an output voltage of an accessory battery to a power cable after boosting. After the voltage application processing, check processing is performed to check whether a short-circuit is present in the charger relay by comparing a terminal voltage of a first capacitor and a terminal voltage of a second capacitor. After the check processing, discharge processing is performed to control the DC-DC converter to discharge at least the first capacitor.

7 Claims, 7 Drawing Sheets

ABNORMALITY DIAGNOSIS APPARATUS FOR POWER CONTROL SYSTEM

CROSS REFERENCE TO RELATED APPLICATION

The present application incorporates herein by reference Japanese patent application No. 2012-86666 filed on Apr. 5, 2012.

TECHNICAL FIELD

The present disclosure relates to an abnormality diagnosis apparatus for a power control system, which includes a main relay and a charger relay in a power cable connecting a battery, which supplies power to a motor provided as a drive power source of a vehicle, and a charger, which is connected to an external power source provided outside the vehicle.

BACKGROUND

A hybrid vehicle and an electric vehicle, in which a motor is mounted as a drive power source of a vehicle, are proposed to meet social demands for low fuel consumption and low exhaust emission. As a power control system for such a vehicle, JP 2007-295699A (US 2009/0108674A1) discloses one exemplary system. In this system, an inverter, a bidirectional DC-DC converter, a capacitor and the like are connected to a battery (main charge storage device) such as a secondary battery through a main relay, which has positive-side and negative-side switches. The inverter is connected to a motor and the DC-DC converter is connected to an accessory battery (charge storage device for accessory equipment).

According to this system, the DC-DC converter is driven with the positive-side and the negative-side switches of the main relay being tuned off to charge the capacitor until a voltage VL across both terminals of the capacitor reaches a predetermined voltage Vth1. Then the voltage across the terminals of the capacitor is compared with a reference voltage Vth2 with the positive-side switch and the negative side switch of the main relay being turned on and off. Thus it is checked whether the negative-side switch of the main relay is short-circuited by a relay switch fixedly welded to a terminal.

In some power control apparatuses for a plug-in hybrid vehicle and an electric vehicle, which is chargeable by an external power source provided outside the vehicle, a charger relay is provided in a power cable connecting a battery and a charger connectable to the external power source.

SUMMARY

It is therefore an object of the present disclosure to provide an abnormality diagnosis apparatus for a power control system, which is capable of checking whether a short-circuit is present in a charger relay.

According to one aspect, an abnormality diagnosis apparatus is provided for a power control system, which includes a main battery provided to supply electric power to a motor, which is a drive power source of a vehicle; a main relay provided in a power cable, which connects the main battery and a charger device connectable to an external power source; a charger relay provided between the main relay and the charger device in the power cable; a bidirectional converter connected between the main relay and the charger relay in the power cable; and an accessory battery connected to the bidirectional converter.

The abnormality diagnosis apparatus comprises a first capacitor connected between the main relay and the charger relay in the power cable; a first voltage sensor provided to detect a first voltage across the first capacitor; a second capacitor connected between the charger relay and the charger device in the power cable; a second voltage sensor provided to detect a second voltage across the second capacitor; and a diagnosis unit configured to perform voltage application processing and check processing by turning off the main relay and the charger relay. The voltage application processing controls the bidirectional converter to apply a voltage of the accessory battery to the power cable. The check processing checks whether a short-circuit is present in the charger relay by comparing the first voltage and the second voltage after the voltage application processing.

BRIEF DESCRIPTION OF THE DRAWINGS

The above and other objects, features and advantages abnormality diagnosis apparatus will become more apparent from the following detailed description made with reference to the accompanying drawings. In the drawings.

DETAILED DESCRIPTION OF THE EMBODIMENT

Figure 1:
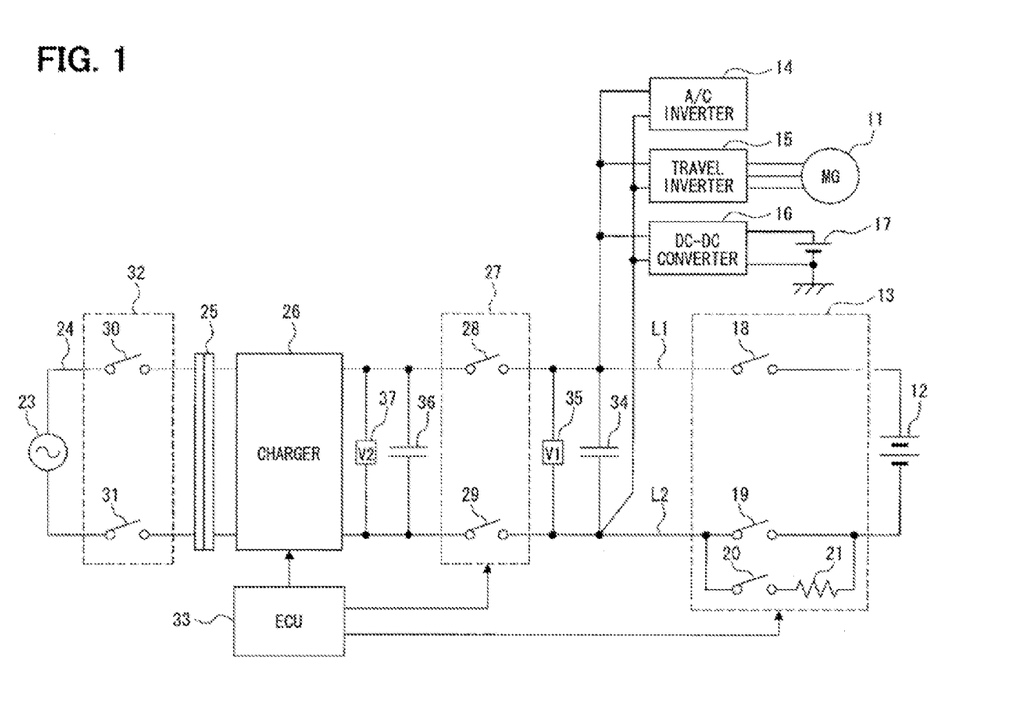
FIG. 1 is a block diagram of a power control system for a vehicle, in which an abnormality diagnosis apparatus according to one embodiment is implemented.

One embodiment of an abnormality diagnosis apparatus will be described below with reference to FIG. 1, in which the abnormality diagnosis apparatus is incorporated in, for example, a plug-in hybrid vehicle or electric vehicle chargeable by an external battery.

A motor-generator 11 (motor), which is a drive power source of a vehicle, and a high-voltage battery, which supplies electric power to the motor-generator 11 as a main battery 12, are mounted in a vehicle. A charger device 26 is connected to an external power connector device 25, which is connectable to a commercial power source 23 (AC power source) provided outside a vehicle through a charger cable 24. A main relay 13 is provided in power cables L1 and L2, which connect the charger device 26 and the main battery 12.

The main relay 13 includes switches 18 and 19 at a positive-side and a negative-side of the main battery 12, respectively. A pre-charge switch 20 and a resistor 21 are connected in parallel to the switch 19 at the negative-side of the main battery 12. When the main relay 13 is set in an on-state (both positive-side and negative-side switches 18 and 19 are turned on and in on-state), the switch 20 for pre-charging is turned on, the switch 19 is then turned on and the switch 20 is turned off.

A charger relay 27 is provided between the main relay 13 and the charger device 26 in the power cables L1 and L2. The charger relay 27 includes switches 28 and 29 at the positive-side and the negative-side of the main battery 12, respectively. A cable-integrated relay 32, which includes switches 30 and 31, is provided in the charger cable 24.

An inverter 14 for an air-conditioner and an inverter 15 for vehicle travel are connected to the power cables L1 and L2, at a point between the main relay 13 and the charger relay 27. The motor-generator 11 is connected to the inverter 15 for vehicle travel. Further a bidirectional DC-DC converter 16 is also connected to the power cables L1 and L2 at a point between the main relay 13 and the charger relay 27. An accessory battery 17, which is a low-voltage battery, is connected to the DC-DC converter 16. This accessory battery 17 is connected to various electric accessory equipment (not shown) through accessory relays (not shown).

A first capacitor 34 and a first voltage sensor 35, which detects a first voltage (terminal voltage) V1 across terminals of the first capacitor 34, are connected to the power lines L1 and L2 at a point between the main relay 13 and the charger relay 27. A second capacitor 36 and a second voltage sensor 37, which detects a second voltage (terminal voltage) V2 across terminals of the second capacitor 36, are connected to the power cables L1 and L2 at a point between the charger relay 27 and the charger device 26.

An electronic control unit (ECU) 33 is provided and configured to control operations of the main relay 13, the charger relay 27, the inverters 14, 15, the DC-DC converter 16 and the like. The ECU 33 includes a microcomputer, which is programmed to perform various routines, which includes routines for diagnosing short-circuits as shown in FIG. 3 to FIG. 6 and described later. Thus, the ECU 33 also operates as an abnormality diagnosis unit. The routines include voltage application processing, short-circuit check processing and discharge processing.

In the voltage application processing, the DC-DC converter 16 is controlled to apply a voltage to the power cables L1 and L2 by turning of the main relay 13 to its full-off state (both positive-side and negative-side switches 18 to 20 are in off-state) and turning of the charger relay 27 to its full-off state (both positive-side and negative-side switches 28 and 29 are in off-state) or to its half-off state (only one of positive-side and negative-side switches 28 and 29 is in off-state). In the short-circuit check processing, which follows the voltage application processing, the terminal voltage V1 and the terminal voltage V2 are compared to check whether a short-circuit is present in the charger relay 27. In the discharge processing, which follows the short-circuit check processing, the DC-DC converter 16 (or the inverter 15 for vehicle travel) is controlled to discharge the first capacitor 34.

In a case of performing the voltage application processing for controlling the DC-DC converter 16 to apply a voltage to the power cables L1 and L2, by turning of the main relay 13 and turning off the charger relay 27, only the first capacitor 34 is charged and the second capacitor 36 is not charged if the charger relay 27 is normal (that is, the charger relay 27 is normal and in the off-state). In this case, the terminal voltage V1 should be higher than the terminal voltage V2. If the charger relay 27 has a short-circuit therein and is in the on-state, for example, the switches 28 and 29 are fixedly welded to respective terminals by heat or the like, the first capacitor 34 and the second capacitor 36 are both charged and the voltage V1 and the voltage V2 are generally equal. By performing the short-circuit check processing for the charger relay 27 by comparing the voltage V1 and the voltage V2 after the voltage application processing, it is possible to determine with high accuracy whether the charger relay 27 has abnormality of short-circuit.

Figure 2:
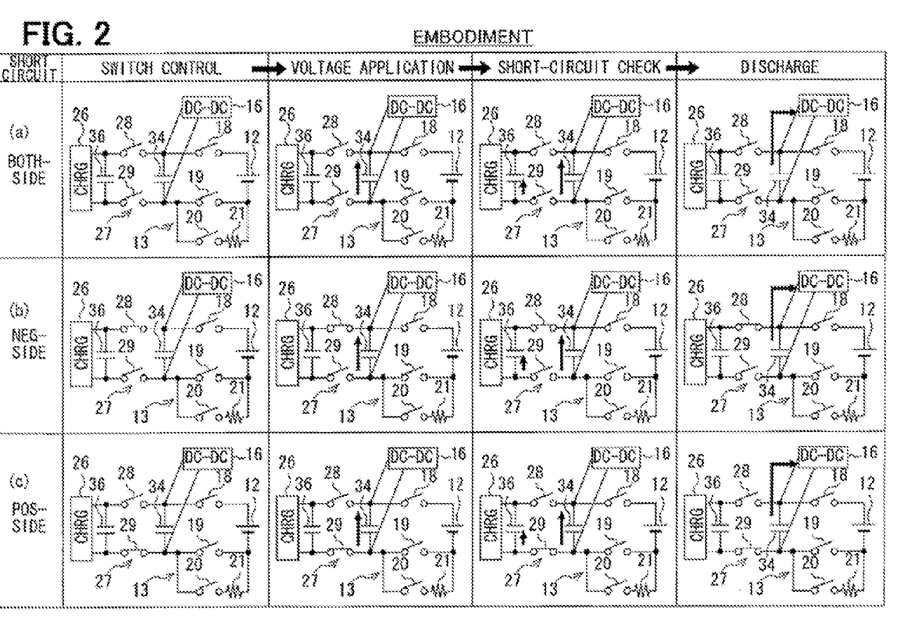
FIG. 2 is illustration of charger relay short-circuit diagnosis operations according to the embodiment.

As shown in FIG. 2, the short-circuit of the charger relay 27 is diagnosed by (a) both-side short-circuit diagnosis, (b) negative-side short-circuit diagnosis and (c) positive-side short-circuit diagnosis.

(a) In the both-side short-circuit diagnosis, relay switches are controlled in such a manner that the main relay 13 is turned to the full off-state and the charger relay 27 to the full off-state. Then the voltage application processing is performed to control the DC-DC converter 16 to apply the output voltage of the accessory battery 17 to the power cables L1 and L2 after boosting the output voltage of the accessory battery 17 by the DC-DC converter 16. After stopping the voltage application of the DC-DC converter 16, the both-side short-circuit check processing is performed by comparing the terminal voltage V1 and the terminal voltage V2 and checking whether the both-side short-circuit is present, in which both of the positive-side switch 28 and the negative-side switch 29 of the charger relay 27 are abnormally short-circuited to the on-state by, for example, welding. Then the discharge processing is performed to control the DC-DC converter 16 (or inverter 15 for vehicle travel) to discharge at least the first capacitor 34.

(b) In the negative-side short-circuit diagnosis, the main relay 13 is turned to the full-off state and the charger relay 27 is turned to the half off-state at the negative-side, in which only the switch 28 at the positive side is turned on and the switch 29 at the negative side is turned off. Then the voltage application processing is performed to control the DC-DC converter 16 to apply the output voltage of the accessory battery 17 to the power cables L1 and L2 after boosting. After stopping the voltage application of the DC-DC converter 16, the negative-side short-circuit check processing is performed by comparing the terminal voltage V1 and the terminal voltage V2 and checking whether the negative-side short-circuit is present, in which only the negative-side switch 29 of the charger relay 27 is abnormally short-circuited. Then the discharge processing is performed to control the DC-DC converter 16 (or inverter 15 for vehicle travel) to discharge at least the first capacitor 34.

(c) In the positive-side short-circuit diagnosis, the main relay 13 is turned to the full-off state and the charger relay 27 is turned to the half off-state at the positive-side, that is, the switch 29 at the negative side is turned on and the switch 28 at the positive side is turned off. Then the voltage application processing is performed to control the DC-DC converter 16 to apply the output voltage of the accessory battery 17 to the power cables L1 and L2 after boosting. After stopping the voltage application of the DC-DC converter 16, the positive-side short-circuit check processing is performed by comparing the terminal voltage V1 and the terminal voltage V2 anti checking whether the positive-side short-circuit is present, in which only the positive-side switch 28 of the charger relay 27 is abnormally short-circuited. Then the discharge processing is performed to control the DC-DC converter 16 (or inverter 15 for vehicle travel) to discharge at least the first capacitor 34.

The above-described short-circuit diagnosis of the charger relay 27 is performed by the ECU 33 in accordance with the short-circuit diagnosis routines shown in FIG. 3 to FIG. 6. Processing in each routine will be described below.

[Short-Circuit Diagnosis Routine]

Figure 3:
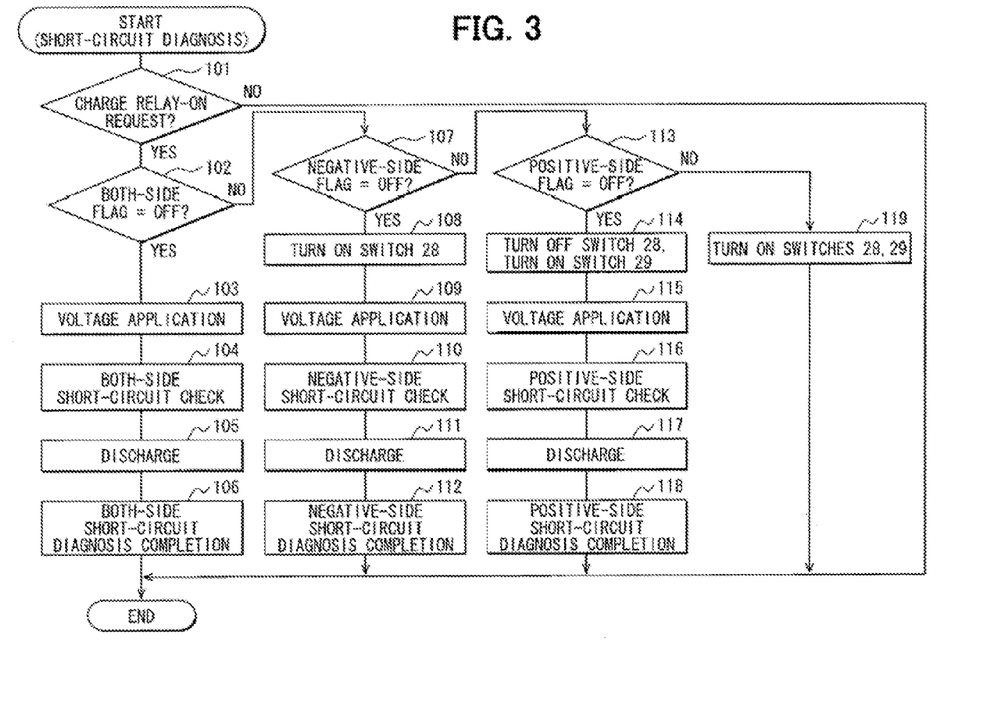
FIG. 3 is a flowchart showing processing of a short-circuit diagnosis routine.

The ECU 33 repeats the short-circuit diagnosis routine shown in FIG. 3 at every predetermined interval as a short-circuit diagnosis unit.

When this routine is started, it is checked at step 101 whether a request for turning on the charger relay 27 (charger relay-on request) is issued, for example, by checking whether the charger cable 24 is connected. If it is determined at step 101 that the turn-on request for the charger relay 27 is not issued, this routine is finished without performing step 102 and subsequent steps.

If it is determined at step 101 that the turn-on request for the charger relay 27 is issued, step 102 is performed to check whether a both-side short-circuit diagnosis completion flag is OFF. This both-side short-circuit diagnosis completion flag is set to ON and reset to OFF, which indicates that the both-side short-circuit diagnosis about the charger relay 27 has been completed and not completed, respectively, by a both-side short-circuit diagnosis completion flag control routine shown in FIG. 4 and described below.

If it is determined at step 102 that the both-side short-circuit diagnosis completion flag is OFF (both-side short-circuit diagnosis of the charger relay 27 is not completed yet), the both-side short-circuit diagnosis of the charger relay 27 is performed as follows.

With the main relay 13 and the charger relay 27 being maintained in the full off-states, respectively, the voltage application processing is performed to control the DC-DC converter 16 to boost the output voltage of the accessory battery 17 to the predetermined voltage and apply the boosted voltage to the power cables L1 and L2, that is, the first capacitor 44. If the charger relay 27 is in the full off-state as operating normally, only the first capacitor 34 is charged but the second capacitor 36 is not charged. If both-side short-circuit is present in the charger relay 27, that is, the charger relay 27 is in the on-state, both the first capacitor 34 and the second capacitor 36 are charged.

After stopping the voltage application of the DC-DC converter 16, step 104 is performed to perform the both-side short-circuit check processing. In this both-side short-circuit check processing, the terminal voltage V1 is detected by the first voltage sensor 35 and the second terminal voltage V2 is detected by the second voltage sensor 37. By comparing the terminal voltage V1 and the terminal voltage V2, it is checked whether the positive-side and the negative-side switches 28 and 29 of the charger relay 27 are in the both-side short-circuit, in which both switches 28 and 29 are welded to terminals and cannot be turned off.

Specifically, for example, it is checked whether a difference $\Delta V$ ($=V1-V2$) between the terminal voltage V1 and the terminal voltage V2 is equal to or less than a predetermined threshold voltage. If it is determined that the difference $\Delta V$ between the terminal voltage V1 and the terminal voltage V2 is equal to or less than the predetermined voltage, it is determined that the terminal voltage V1 and the terminal voltage V2 are generally equal to each other and the charger relay 27 have the both-side short-circuit at the charger relay 27. If it is determined that the difference $\Delta V$ between the terminal voltage V1 and the terminal voltage V2 is greater than the predetermined value, it is determined that the terminal voltage V1 is greater than the terminal voltage V2 and the charger relay 27 has no both-side short-circuit.

Then at step 105, the discharge processing is performed to control the DC-DC converter 16 (inverter 15 for vehicle travel) so that at least the first capacitor 34 is discharged. Specifically, electric energy having been charged in the first capacitor 34 is returned to the accessory battery 17 through the DC-DC converter 16 thereby charging the accessory battery 17. If the charger relay 27 has the short-circuit and is in the on-state, electric energy having been charged in the second capacitor 36 is returned to the accessory battery 17 through the DC-DC converter 16 thereby charging the accessory battery 17. If it is not possible to charge the accessory battery 17 (for example, battery 17 is fully charged), the DC voltage of the power cables L1 and L2 may be converted into an AC voltage by the inverter 15 for vehicle travel and supplied to the motor-generator 11. Thus the first capacitor 34 and the second capacitor 36 are discharged.

Then at step 106, it is determined that the both-side short-circuit diagnosis about the charger relay 27 is completed, and this routine is finished.

If it is determined at step 102 that the both-side short-circuit diagnosis completion flag is ON, that is, both-side short-circuit diagnosis of the charger relay 27 has been completed, step 107 is performed to check whether the negative-side short-circuit diagnosis is OFF. This negative flag is set to ON and reset to OFF, which indicates that the negative-side short-circuit diagnosis about the charger relay 27 has been completed and not completed, respectively, by a negative-side short-circuit diagnosis completion flag control routine shown in FIG. 5 and described below.

If it is determined at step 107 that the negative-side short-circuit diagnosis completion flag is OFF (negative-side short-circuit diagnosis of the charger relay 27 has not been completed yet), the negative-side short-circuit diagnosis of the charger relay 27 is performed as follows.

At step 108, the switch 28 of the charger relay 27 is turned on to turn the charger relay 27 in the half off-state at the negative side (only positive-side switch 28 is in the on-state but negative-switch 29 is in the off-state). Then at step 209, the voltage application processing is performed to control the DC-DC converter 16 to boost the output voltage of the accessory battery 17 to the predetermined voltage and apply the boosted voltage to the power cables L1 and L2. If the charger relay 27 is in the half off-state at the negative side as operating normally, only the first capacitor 34 is charged and the second capacitor 36 is not charged. If the negative-side short-circuit is present in the charger relay 27 and the charger relay 27 is in the on-state, both the first capacitor 34 and the second capacitor 36 are charged.

After stopping the voltage application of the DC-DC converter 16, step 110 is performed to perform the negative-side short-circuit check processing. In this negative-side short-circuit check processing, the terminal voltage V1 is detected by the first voltage sensor 35 and the second terminal voltage V2 is detected by the second voltage sensor 37. By comparing the terminal voltage V1 and the terminal voltage V2, it is checked whether only the negative-side switch 29 of the charger relay 27 is in the negative-side short-circuit.

Specifically, for example, it is checked whether the difference $\Delta V$ ($=V1-V2$) between the terminal voltage V1 and the terminal voltage V2 is equal to or less than a predetermined threshold voltage. If it is determined that the difference $\Delta V$ between the terminal voltage V1 and the terminal voltage V2 is equal to or less than the predetermined threshold voltage, it is determined that the terminal voltage V1 and the terminal voltage V2 are generally equal to each other and the charger relay 27 has the negative-side short-circuit at the charger relay 27. If it is determined that the difference $\Delta V$ between the terminal voltage V1 and the terminal voltage V2 is greater than the predetermined threshold voltage, it is determined that the terminal voltage V1 is greater than the terminal voltage V2 and the charger relay 27 has no negative-side short-circuit.

Then at step 111, the discharge processing is performed to control the DC-DC converter 16 (inverter 15 for vehicle travel) so that at least the first capacitor 34 is discharged. Then at step 112, it is determined that the negative-side short-circuit diagnosis about the charger relay 27 is completed, and this routine is finished.

If it is determined at step 107 that the negative-side short-circuit diagnosis completion flag is ON, that is, the negative-side short-circuit diagnosis of the charger relay 27 has been completed, step 113 is performed to check whether the positive-side short-circuit diagnosis completion flag is OFF. This positive-side short-circuit diagnosis completion flag is set to ON and reset to OFF, which indicates that the positive-side short-circuit diagnosis about the charger relay 27 has been completed and not completed, respectively, by a positive-side short-circuit diagnosis completion flag control routine shown in FIG. 6 and described below.

If it is determined at step 113 that the positive-side short-circuit diagnosis completion flag is OFF, that is, the positive-side short-circuit diagnosis of the charger relay 27 has not been completed yet, the positive-side short-circuit diagnosis of the charger relay 27 is performed as follows.

At step 114, the positive-side switch 28 of the charger relay 27 is turned off and the negative-side switch 29 of the charger relay 27 is turned on to turn the charger relay 27 in the half off-state at the negative-side, that is, the negative-side switch 29 is in the off-state and the positive-side switch 28 is in the off-state. Then at step 115, the voltage application processing is performed to control the DC-DC converter 16 to boost the output voltage of the accessory battery 17 to the predetermined voltage and apply the boosted voltage to the power cables L1 and L2. If the charger relay 27 is in the half off-state at the positive side as operating normally, only the first capacitor 34 is charged and the second capacitor 35 is not charged. If the positive-side short-circuit is present in the charger relay 27 and the charger relay 27 is in the on-state, both the first capacitor 34 and the second capacitor 36 are charged.

After stopping the voltage application of the DC-DC converter 16, step 116 is performed to perform the positive-side short-circuit check processing. In this positive-side short-circuit check processing, the terminal voltage V1 is detected by the first voltage sensor 35 and the second terminal voltage V2 is detected by the second voltage sensor 37. By comparing the terminal voltage V1 and the terminal voltage V2, it is checked whether only the positive-side switch 29 of the charger relay 27 is abnormally in the positive-side short-circuit.

Specifically, for example, it is checked whether the difference $\Delta V$ (=V1−V2) between the terminal voltage V1 and the terminal voltage V2 is equal to or less than a predetermined threshold voltage. If it is determined that the difference $\Delta V$ between the terminal voltage V1 and the terminal voltage V2 is equal to or less than the predetermined voltage, it is determined that the terminal voltage V1 and the terminal voltage V2 are generally equal to each other and the charger relay 27 has the positive-side short-circuit. If it is determined that the difference $\Delta V$ between the terminal voltage V1 and the terminal voltage V2 is greater than the predetermined voltage, it is determined that the terminal voltage V1 is greater than the terminal voltage V2 and the charger relay 27 has no positive-side short-circuit.

Then at step 117, the discharge processing is performed to control the DC-DC converter 16 (inverter 15 for vehicle travel) so that at least the first capacitor 34 is discharged. Then at step 118, it is determined that the positive-side short-circuit diagnosis about the charger relay 27 is completed, and this routine is finished.

If it is determined at step 113 that the positive-side short-circuit diagnosis completion flag is ON (positive-side short-circuit diagnosis of the charger relay 27 has been completed), step 119 is performed to turn on the positive-side switch 28 and the negative-side switch 29 of the charger relay 27 so that the charger relay 27 is set in the full on-state. Thus this routine is finished.

[Both-Side Short-Circuit Diagnosis Completion Flag Control Routine]

Figure 4:
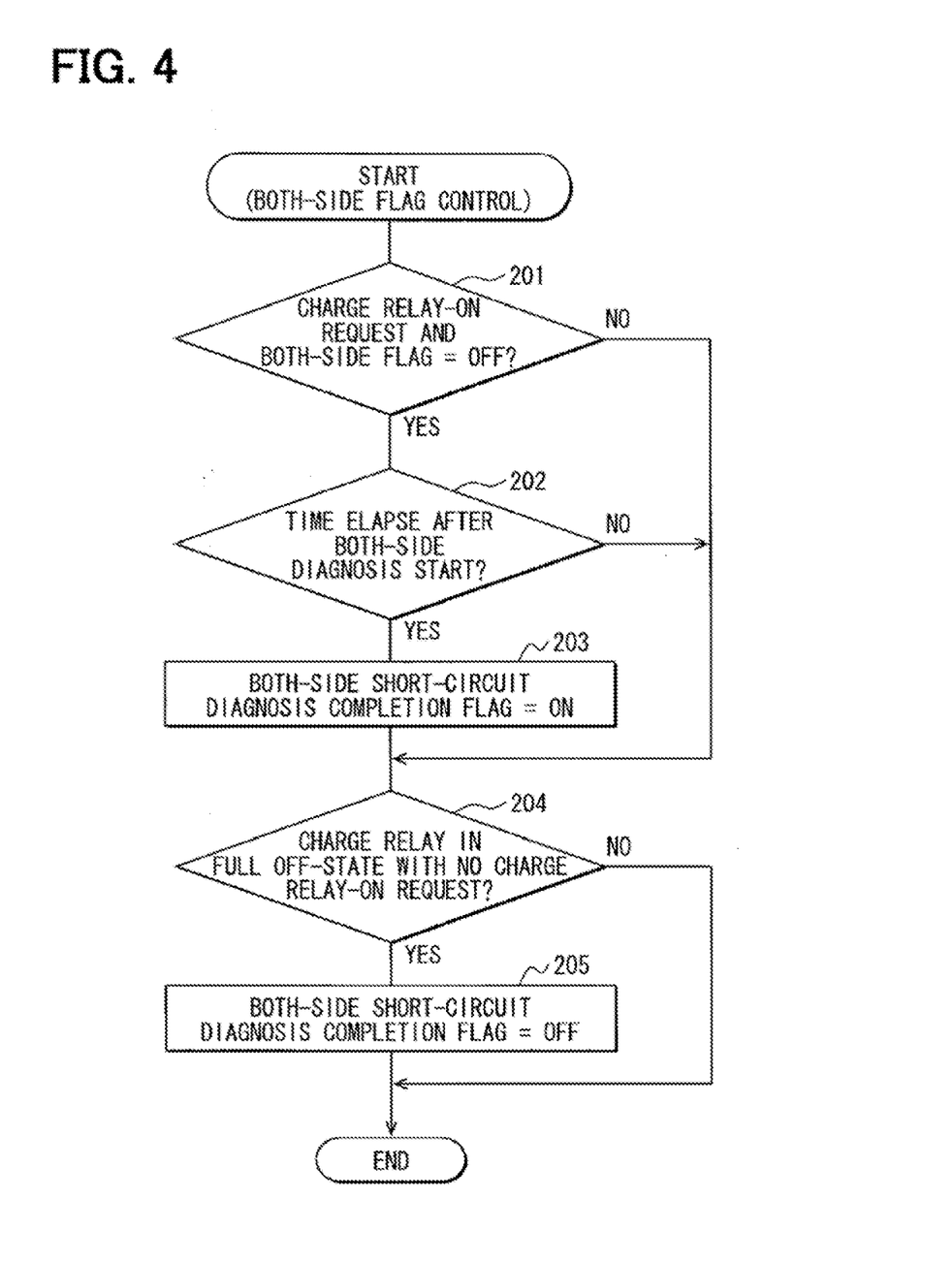
FIG. 4 is a flowchart showing processing of a both-side short-circuit diagnosis completion flag control routine.

The ECU 33 repeats the both-side short-circuit diagnosis routine shown in FIG. 4 as a both-side flag control routine at every predetermined interval. When this routine is started, it is checked at step 201 whether a turn-on request for the charger relay 27 is issued and the both-side short-circuit diagnosis completion flag is OFF. If it is determined at step 201 that the turn-on request for the charger relay 27 is not issued or the both-side short-circuit diagnosis completion flag is ON, step 204 is performed.

If it is determined at step 201 that the turn-on request for the charger relay 27 is issued and the both-side short-circuit diagnosis completion flag is OFF, step 202 is performed to check whether the both-side short-circuit diagnosis has been started and a predetermined time elapsed after the start of the both-side short-circuit diagnosis. This predetermined time is set to be slightly longer than a time required to normally complete the both-side short-circuit diagnosis.

If it is determined at step 202 that the both-side short-circuit diagnosis has not been started yet or the predetermined time has not elapsed yet, step 204 is performed.

If it is determined at step 202 that the both-side short-circuit diagnosis has been started and the predetermined time has elapsed, step 203 is performed to set the both-side short-circuit diagnosis completion flag to ON.

It is then checked at step 204 whether the turn-on request for the charger relay 27 is not issued and the charger relay 27 is in the full off-state, that is, both the positive-side and the negative-side switches 28 and 29 are in the off-state. If it is determined at step 204 that the turn-on request for the charger relay 27 is not issued or the charger relay 27 is in the full off-state, this routine is finished.

If it is determined at step 204 that the turn-on request for the charger relay 27 is not issued and the charger relay 27 is in full off-state, step 205 is performed to rest the both-side short-circuit diagnosis completion flag to OFF. Thus this routine is finished.

Time points to set the both-side short-circuit diagnosis completion flag to ON and to reset the both-side short-circuit diagnosis completion flag to OFF may be changed as the case may be. For example, the both-side short-circuit diagnosis completion flag may be set to ON at a time point when it is determined at step 106 in FIG. 3 that the both-side short-circuit diagnosis about the charger relay 27 is completed.

[Negative-Side Short-Circuit Diagnosis Completion Flag Control Routine]

Figure 5:
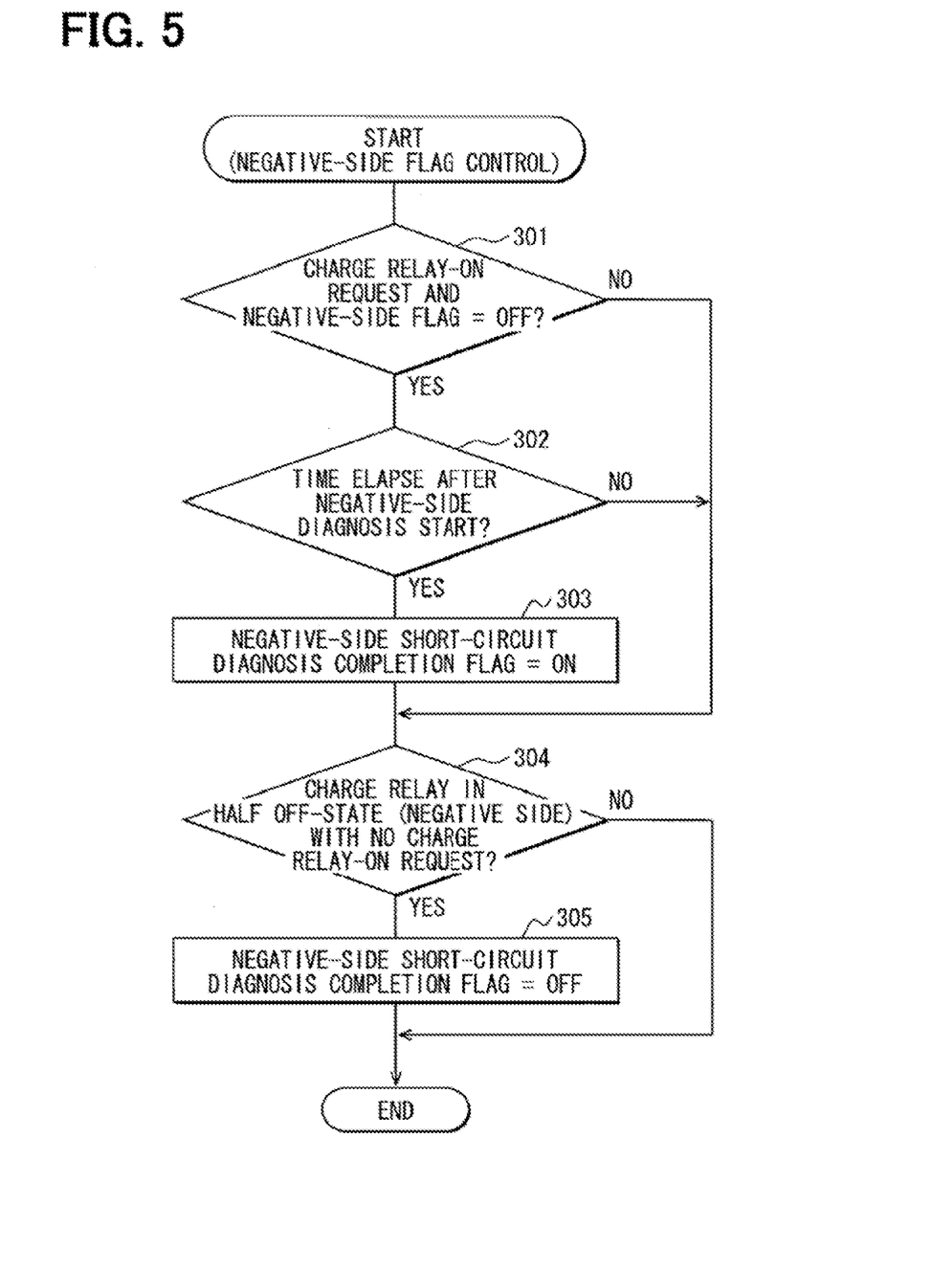
FIG. 5 is a flowchart showing processing of a negative-side short-circuit diagnosis completion flag control routine.

The ECU 33 repeats the negative-side short-circuit diagnosis routine shown in FIG. 5 as a negative-side flag control routine at every predetermined interval.

When this routine is started, it is checked at step 30 whether a turn-on request for the charger relay 27 is issued and the negative-side short-circuit diagnosis completion flag is OFF. If it is determined at step 301 that the turn-on request for the charger relay 27 is not issued or the negative-side short-circuit diagnosis completion flag is not OFF, step 304 is performed.

If it is determined at step 301 that the turn-on request for the charger relay 27 is issued and the negative-side short-circuit diagnosis completion flag is OFF, step 302 is performed to check whether the negative-side short-circuit diagnosis has been started and a predetermined time elapsed after the start of the negative-side short-circuit diagnosis. This predetermined time is set to be slightly longer than a time required to normally complete the negative-side short-circuit diagnosis.

If it is determined at step 302 that the negative-side short-circuit diagnosis has not been started yet or the predetermined time has not elapsed yet, step 304 is performed.

If it is determined at step 302 that the negative-side short-circuit diagnosis has been started and the predetermined time elapsed, step 303 is performed to set the negative-side short-circuit diagnosis completion flag to ON.

It is then checked at step 304 whether the turn-on request for the charger relay 27 is not issued and the charger relay 27 is in the half off-state, that is, the positive-side switch 28 is in the on-state and the negative-side switch 29 is in the off-state. If it is determined at step 304 that the turn-on request for the charger relay 27 is issued or the charger relay 27 is not in the half off-state at the negative-side, this routine is finished.

If it is determined at step 304 that the turn-on request for the charger relay 27 is not issued and the charger relay 27 is in the half off-state at the negative side, step 305 is performed to reset the negative-side short-circuit diagnosis completion flag to OFF. Thus this routine is finished.

Time points to set the negative-side short-circuit diagnosis completion flag to ON and to reset the negative-side short-circuit diagnosis completion flag to OFF may be changed as the case may be. For example, the negative-side short-circuit diagnosis completion flag may be set to ON at a time point when it is determined at step 112 in FIG. 3 that the both-side short-circuit diagnosis about the charger relay 27 is completed.

[Positive-Side Short-Circuit Diagnosis Completion Flag Control Routine]

Figure 6:
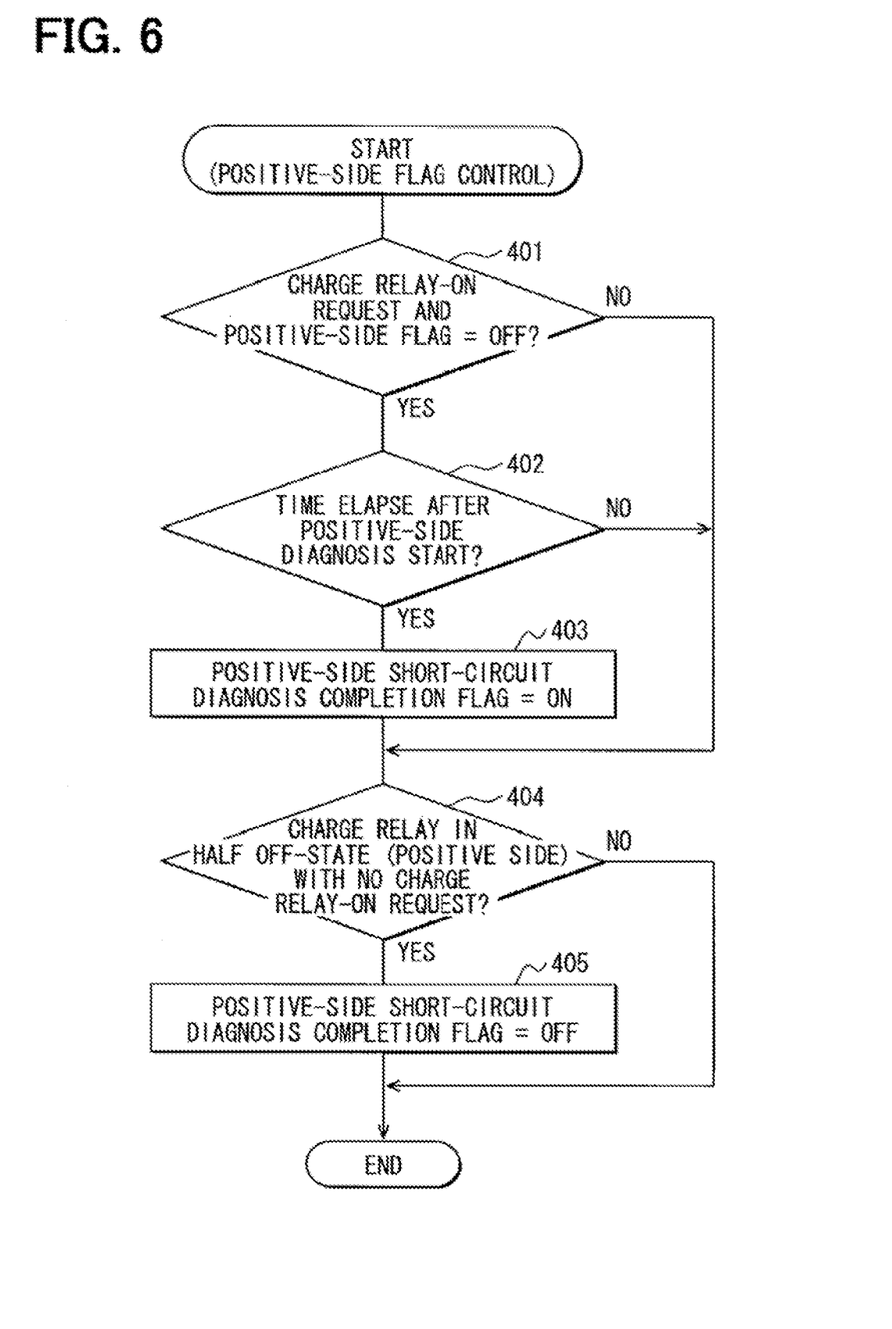
FIG. 6 is a flowchart showing processing of a positive-side short-circuit diagnosis completion flag control routine.

The ECU 33 repeats the positive-side short-circuit diagnosis routine shown in FIG. 6 as a positive-die flag control routine at every predetermined interval.

When this routine is started, it is checked at step 401 whether a turn-on request for the charger relay 27 is issued and the positive-side short-circuit diagnosis completion flag is OFF. If it is determined at step 401 that the turn-on request for the charger relay 27 is not issued or the positive-side short-circuit diagnosis completion flag is not OFF, step 404 is performed.

If it is determined at step 401 that the turn-on request for the charger relay 27 is issued and the positive-side short-circuit diagnosis completion flag is OFF, step 402 is performed to check whether the positive-side short-circuit diagnosis has been started and a predetermined time elapsed after the start of the negative-side short-circuit diagnosis. This predetermined time is set to be slightly longer than a time required to normally complete the positive-side short-circuit diagnosis.

If it is determined at step 402 that the positive-side short-circuit diagnosis has not been started yet or the predetermined time does not elapse yet, step 404 is performed.

If it is determined at step 402 that the positive-side short-circuit diagnosis has been started and the predetermined time elapsed, step 403 is performed to set the positive-side short-circuit diagnosis completion flag to ON.

It is then checked at step 404 whether the turn-on request for the charger relay 27 is not issued and the charger relay 27 is in the half off-state, that is, the negative-side switch 29 is in the on-state and the positive-side switch 28 is in the off-state. If it is determined at step 404 that the turn-on request for the charger relay 27 is issued or the charger relay 27 is not in the half off-state at the positive side, this routine is finished.

If it is determined at step 404 that the turn-on request for the charger relay 27 is not issued and the charger relay 27 is in the half off-state at the positive side, step 405 is performed to reset the positive-side short-circuit diagnosis completion flag to OFF. Thus this routine is finished.

Time points to set the positive-side short-circuit diagnosis completion flag to ON and to reset the positive-side short-circuit diagnosis completion flag to OFF may be changed as the case may be. For example, the positive-side short-circuit diagnosis completion flag may be set to ON at a time point when it is determined at step 118 in FIG. 3 that the positive-side short-circuit diagnosis about the charger relay 27 is completed.

According to the present embodiment described above, the voltage application processing is performed to control the DC-DC converter 16 to apply the voltage to the power cables after boosting the output voltage of the accessory battery 17, after turning the main relay 13 to the full off-state and turning the charger relay 27 to the full off-state or the half off-state. After the application of the voltage boosted by the DC-DC converter 16, the check processing is performed to check whether the short-circuit is present in the charger relay 27 by comparing the terminal voltage V1 and the terminal voltage V2. As a result, it is possible to accurately determine that the charger relay 27 has the short-circuit abnormality.

Figure 7:
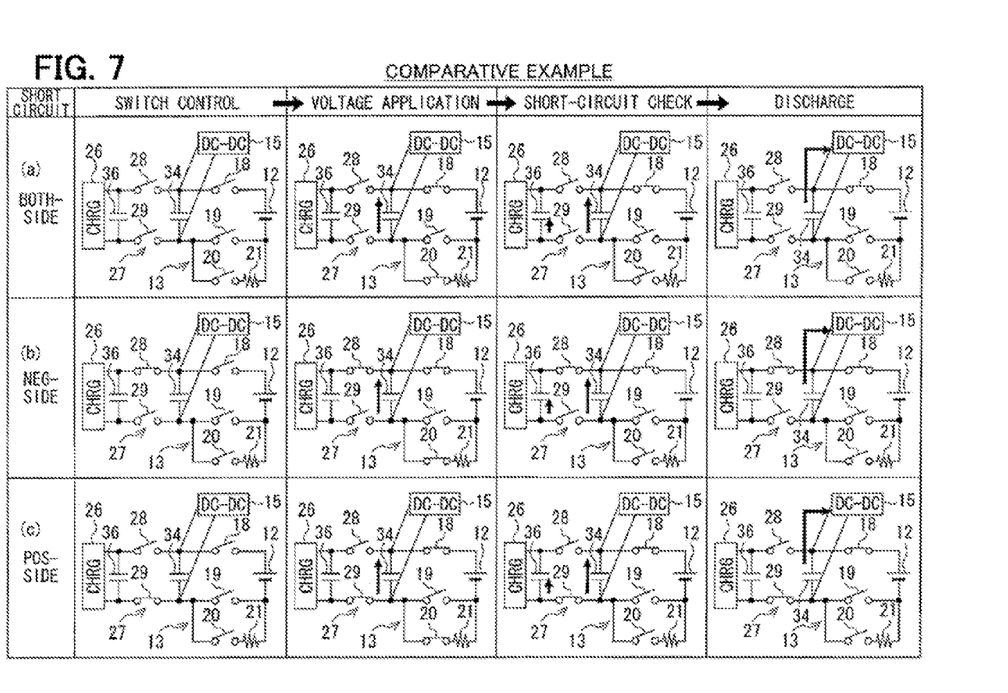
FIG. 7 is illustration of charger relay short-circuit diagnosis operations according to a comparative example.

A comparative example of a power control system is shown in FIG. 7. In this comparative system, it is assumed that voltage application processing is performed to apply a voltage of a main battery 12 to power cables L1 and L2 by switching a main relay 13 to an on-state, after turning the charger relay 27 to a full off-state or a half off-state. After this voltage application processing, the check processing is performed to check whether the short-circuit is present in the charger relay 27 by switching the main relay 13 to the off-state and comparing a terminal voltage V1 and a terminal voltage V2. It is necessary in this system to switch the main relay 13 to the on-state or to the off-state. It is therefore likely that the number of times of operations (number of times of being turned on and off) of the main relay 13 is increased and the durability life is shortened.

According to the present embodiment, however, it is only necessary to maintain the main relay 13 in the off-state and need not be operated to switch over when the charger relay 27 is subjected to the short-circuit diagnosis. As a result, the number of times of operations of the main relay 13 is decreased and its durability life is lengthened.

According to the present embodiment, the discharge processing is performed to control the DC-DC converter 16 to discharge at least the first capacitor 34 after the check processing, which is performed to check whether the charger relay 27 has the short-circuit. As a result, the electric energy having been charged in the first capacitor 34 can be restored to the accessory battery 17 through the DC-DC converter 16. Further, in a case that the charger relay 27 has the short-circuit therein and is in the on-state, the electric energy having been charged in the second capacitor 36 can also be restored to the accessory battery 17 through the DC-DC converter 16 and hence energy loss can be reduced.

Still further, according to the present embodiment, the both-side short-circuit check processing, the negative-side short-circuit check processing and the positive-side short-circuit check processing are performed. The both-side short-circuit check processing is provided for checking whether the charger relay 27 has the both-side short-circuit, in which both of the positive-side and the negative-side switches 28 and 29 are for example welded. The negative-side short-circuit check processing is provided for checking whether the charger relay 27 has the negative-side short-circuit, in which only the negative-side switch 29 is for example welded. The positive-side short-circuit check processing is provided for checking whether the charger relay 27 has the positive-side short-circuit, in which only the positive-side switch 28 is welded. As

What is claimed is:

1. An abnormality diagnosis apparatus for a power control system, which includes a main battery provided to supply electric power to a motor, which is a drive power source of a vehicle; a main relay provided in a power cable, which connects the main battery and a charger device connectable to an external power source; a charger relay provided between the main relay and the charger device in the power cable; a bidirectional converter connected between the main relay and the charger relay in the power cable; and an accessory battery connected to the bidirectional converter, the abnormality diagnosis apparatus comprising:
 a first capacitor connected between the main relay and the charger relay in the power cable;
 a first voltage sensor provided to detect a first voltage across the first capacitor;
 a second capacitor connected between the charger relay and the charger device in the power cable;
 a second voltage sensor provided to detect a second voltage across the second capacitor; and
 a diagnosis unit configured to perform voltage application processing and check processing by turning off the main relay and the charger relay, the voltage application processing controlling the bidirectional converter to apply a voltage of the accessory battery to the power cable, and the check processing checking whether a short-circuit is present in the charger relay by comparing the first voltage and the second voltage after the voltage application processing.

2. The abnormality diagnosis apparatus according to claim 1, wherein:
 the diagnosis unit is further configured to perform discharge processing to control the bidirectional converter to discharge at least the first capacitor after the check processing to the accessory battery.

3. The abnormality diagnosis apparatus according to claim 1, wherein:
 the charger relay has a positive-side switch and a negative-side switch; and
 the diagnosis unit is configured to perform both-side short-circuit check processing, as the check processing, to check whether the charger relay has both-side short-circuit, in which both of the positive-side switch and the negative-side switch are short-circuited, after performing the voltage application processing with both of the positive-side switch and the negative-side switch of the charger relay being turned off.

4. The abnormality diagnosis apparatus according to claim 1, wherein:
 the charger relay has a positive-side switch and a negative-side switch; and
 the diagnosis unit is configured to perform negative-side short-circuit check processing, as the check processing, to check whether the charger relay has a negative-side short-circuit, in which only the negative-side switch is short-circuited, after performing the voltage application processing with the positive-side switch and the negative-side switch of the charger relay being controlled to turn on and off, respectively.

5. The abnormality diagnosis apparatus according to claim 1, wherein:
 the charger relay has a positive-side switch and a negative-side switch; and
 the diagnosis unit is configured to perform positive-side short-circuit check processing, as the check processing, to check whether the charger relay has a positive-side short-circuit, in which only the positive-side switch is short-circuited, after performing the voltage application processing with the negative-side switch and the positive-side switch of the charger relay being controlled to turn on and off, respectively.

6. The abnormality diagnosis apparatus according to claim 2, wherein:
 the charger relay has a positive-side switch and a negative-side switch;
 the diagnosis unit is configured to perform both-side short-circuit check processing, as the check processing, to check whether the charger relay has both-side short-circuit, in which both of the positive-side switch and the negative-side switch are short-circuited, after performing the voltage application processing with both of the positive-side switch and the negative-side switch of the charger relay being turned off;
 the diagnosis unit is configured to perform negative-side short-circuit check processing, as the check processing, to check whether the charger relay has a negative-side short-circuit, in which only the negative-side switch is short-circuited, after performing the voltage application processing with the positive-side switch and the negative-side switch of the charger relay being controlled to turn on and off, respectively; and
 the diagnosis unit is configured to perform positive-side short-circuit check processing, as the check processing, to check whether the charger relay has a positive-side short-circuit, in which only the positive-side switch is short-circuited, after performing the voltage application processing with the negative-side switch and the positive-side switch of the charger relay being controlled to turn on and off, respectively.

7. A system comprising:
 a main battery provided to supply electric power to a motor, which is a drive power source of a vehicle;
 a main relay provided in a power cable, which connects the main battery and a charger device connectable to an external power source;
 a charger relay provided between the main relay and the charger device in the power cable, the charger relay being provided at an output side of the charger device;
 a bidirectional converter connected between the main relay and the charger relay in the power cable;
 an accessory battery connected to the bidirectional converter;
 a first capacitor connected between the main relay and the charger relay in the power cable;
 a first voltage sensor provided to detect a first voltage across the first capacitor;
 a second capacitor connected between the charger relay and the charger device in the power cable;
 a second voltage sensor provided to detect a second voltage across the second capacitor; and
 a controller configured to perform voltage application processing and check processing by turning off the main relay and the charger relay, the voltage application processing controlling the bidirectional converter to apply a voltage of the accessory battery to the power cable, and the check processing checking whether a short-circuit is present in the charger relay by comparing the first voltage and the second voltage after the voltage application processing.

* * * * *